No. 783,294. PATENTED FEB. 21, 1905.
E. C. MADDEN.
WHEEL.
APPLICATION FILED APR. 30, 1904.
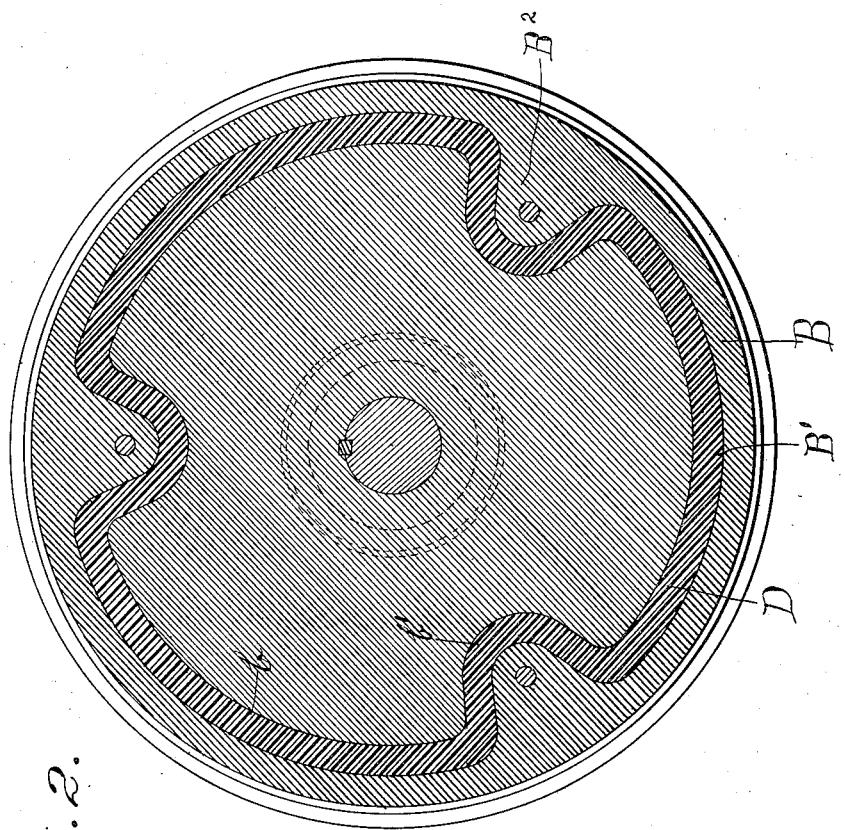
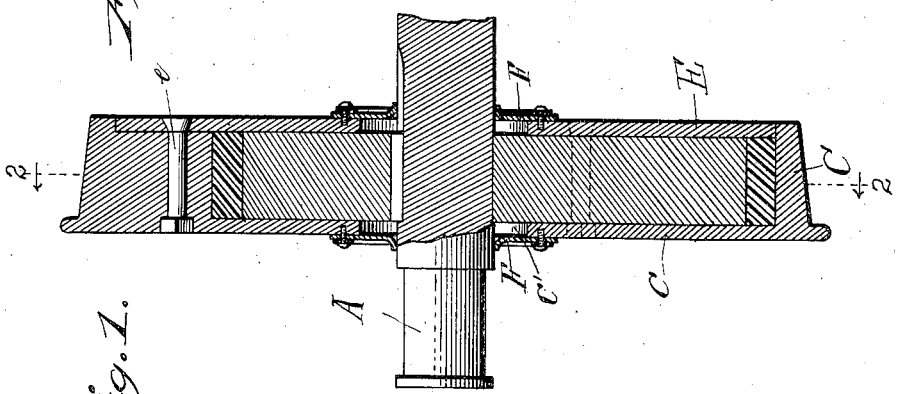
Witnesses
Edwin L. Yewell
Thomas Durant
Inventor
Edwin C. Madden,
By Church & Church
his Attorneys No. 783,294.

Patented February 21, 1905.

UNITED STATES PATENT OFFICE.

EDWIN C. MADDEN, OF WASHINGTON, DISTRICT OF COLUMBIA.

WHEEL.

SPECIFICATION forming part of Letters Patent No. 783,294, dated February 21, 1905.

Application filed April 30, 1904. Serial No. 205,786.

*To all whom it may concern:*

Be it known that I, EDWIN C. MADDEN, a citizen of the United States, residing in Washington, District of Columbia, have invented certain new and useful Improvements in Wheels; and I do hereby declare the following to be a full, clear, and exact description of the same, reference being had to the accompanying drawings, forming a part of this specification, and to the letters of reference marked thereon.

This invention relates to improvements in wheels designed more particularly for use on railways or hard roadways and in connection with vehicles embodying resonant material, such as metal, in their construction, the objects of the invention being to reduce as much as possible the noise due to vibrations set up in the resonant material of the track or vehicle by contact of the wheel-rims or treads with the track or with irregularities in the track.

To these ends the invention contemplates the employment of wheels for the vehicle-rims or tread portions of ordinary construction in so far as peripheral contour is concerned, with hub portions on the axle projecting into proximity to the rims and confined between face-plates rigid with the rims, but not contacting with the axle, the space between the periphery of the hub portion of the structure and the inner face of the rim being filled with a non-resonant material. The space between the hub portion and rim conforms throughout the greater portion of its extent to the contour of the wheel; but at suitable points the rim and hub portions are provided with relatively large projections and corresponding recesses around and into which the non-resonant material passes, so as to completely separate the two in so far as the transmission of noise-vibrations is concerned; but at the same time the maximum strength is afforded both to resist direct downward pressure or vehicle weight or to resist the tendency of the parts to creep one upon the other under the influence of draft or braking strains.

In the accompanying drawings, Figure 1 is a vertical section through a car-wheel embodying the present invention. Fig. 2 is a sectional view on the line 2 2, Fig. 1, looking toward the left.

Like letters of reference in both figures indicate the same parts.

The letter A in said drawings indicates one end of a car-axle having mounted thereon in the manner in which wheels are usually mounted the hub portion or central section B of the wheel embodying the present invention. This hub portion or central section B may be solid, as shown, or of any usual section to insure the rigidity of the wheel and necessary strength of attachment to the axle. The periphery of the section B throughout the major portion of its circumference is concentric, as at $b$; but between such concentric sections are relatively large recesses $b'$, curving inwardly. The width of the periphery is preferably as wide as possible to afford an extended bearing-surface.

The rim C of the wheel is preferably formed in an integral casting having the usual peripheral tread contour, and at one side the said rim is provided with a face-plate $c$, having an inner radial face adapted to fit against one face of the central section B. A central opening $c'$ in the face-plate provides for the passage of the axle without liability of contact between the axle and face-plate. The inner peripheral surface of the rim conforms in contour to the periphery of the central section—that is to say, it has major concentric faces $B'$ and inwardly-extending projections $B^2$, thus forming between the interior of the rim and periphery of the central section a space of practically uniform cross-section throughout. This space is filled with a non-resonant material, such as rubber, (indicated at D,) which material when soft is put in under sufficient compression to support the vertical weight and resist wear and tear without material distortion of the wheel; but at the same time sufficient elasticity is afforded to prevent the transmission of sound-vibrations from the rim to the body of the vehicles or axle and wheel-center. A face-plate E is secured to the side of the rim opposite the plate $c$, the space between said plates forming a chamber in which the central section B fits, said plate E being preferably held in place by bolts e passing through the projections B² of the rim, as shown. To prevent the entry of dust or dirt through the openings in the face-plates around the axle, flexible dust-guards in the form of disks F may be attached to the plates and contact with the axle, as shown in Fig. 1.

From the foregoing it will be seen that the resonant connection between the wheel-rim and body of the wheel, axle, &c., is effectually broken by the non-resonant material, and although a certain degree of elasticity exists between the parts of the wheel the structure is such that the wheel is not weakened. The contour-lines of the surfaces contacting with the resonant material are such that a greatly-extended bearing-surface is always in action. In other words, the non-resonant material is subjected to an almost uniform compression over a wide area, with no tendency to shear or localize the strains. The shape of the recesses and projections is such that radial movement of the rim compresses the non-resonant material to practically the same degree that it is compressed in the concentric portions, and at the same time the recesses and projections are of ample size to insure the necessary strength to resist draft and braking strains without injury to the non-resonant material. Under no circumstances can the rim and wheel center creep with respect to each other, and the body or cross-section of the non-resonant material is preferably such that even should it wear or brush down to a considerable extent the usefulness of the wheel as a means to carry and control the vehicle would not be impaired, inasmuch as the rim and center of the wheel cannot twist out of their proper planes nor rotate with respect to each other, even though no non-resonant material were present.

Having thus described my invention, what I claim as new, and desire to secure by Letters Patent, is—

1. A wheel for preventing the transmission of sound-variations between the road and the vehicle-body, embodying a center section with radial sides secured to the axle and having the major portion of its periphery concentric and inwardly-curved recesses between the adjacent ends of each of such concentric portions, the concentric portions and recesses being extended parallel with the axis to form a continuous wide bearing-surface, a rim having a peripheral tread, the inner face of the rim conforming to the peripheral contour of the center section, a non-resonant material interposed between the center section and rim and filling the space between the two, and face-plates secured to the rim and extending inwardly into proximity to the axle, said plates having radial inner faces in contact with the sides of the center section, substantially as described.

2. A non-resonant wheel for vehicles embodying a rim having its inner surface in concentric sections separated by inwardly-extending projections, a center section having peripheral concentric sections and recesses corresponding in contour to the inner contour of the rim, non-resonant material interposed between the two sections, face-plates rigid on the rim and embracing the center section and securing-bolts for one of the plates, located in the projections of the rim; substantially as described.

EDWIN C. MADDEN.

Witnesses:
ARTHUR M. TRAVERS,
HARWOOD M. BACON.